US010540294B2

(12) United States Patent
Tsirkin et al.

(10) Patent No.: US 10,540,294 B2
(45) Date of Patent: Jan. 21, 2020

(54) SECURE ZERO-COPY PACKET FORWARDING

(71) Applicant: Red Hat Israel, Ltd., Raanana (IL)

(72) Inventors: Michael Tsirkin, Lexington, MA (US); Amnon Ilan, Katzir (IL)

(73) Assignee: Red Hat Israel, Ltd., Raanana (IL)

( * ) Notice: Subject to any disclaimer, the term of this patent is extended or adjusted under 35 U.S.C. 154(b) by 243 days.

(21) Appl. No.: 15/435,402

(22) Filed: Feb. 17, 2017

(65) Prior Publication Data

US 2018/0239715 A1 Aug. 23, 2018

(51) Int. Cl.
*G06F 12/1081* (2016.01)
*G06F 13/28* (2006.01)
*G06F 13/42* (2006.01)
*G06F 9/455* (2018.01)
*G06F 12/109* (2016.01)
*G06F 13/10* (2006.01)

(52) U.S. Cl.
CPC ........ *G06F 12/1081* (2013.01); *G06F 9/4555* (2013.01); *G06F 9/45558* (2013.01); *G06F 12/109* (2013.01); *G06F 13/105* (2013.01); *G06F 13/28* (2013.01); *G06F 13/4282* (2013.01); *G06F 2009/45579* (2013.01); *G06F 2212/151* (2013.01); *G06F 2212/206* (2013.01); *G06F 2212/656* (2013.01); *G06F 2213/0026* (2013.01)

(58) Field of Classification Search
None
See application file for complete search history.

(56) References Cited

U.S. PATENT DOCUMENTS

| 7,721,299 | B2 * | 5/2010 | van Riel | G06F 9/5077 709/212 |
| 8,832,688 | B2 * | 9/2014 | Tang | G06F 9/45545 710/260 |
| 8,930,568 | B1 * | 1/2015 | Chalmer | G06F 13/10 707/705 |
| 9,460,024 | B2 * | 10/2016 | Davda | G06F 12/1081 |
| 9,804,873 | B2 * | 10/2017 | Tsirkin | G06F 9/45558 |
| 9,819,496 | B2 * | 11/2017 | Lin | H04L 29/06 |

(Continued)

FOREIGN PATENT DOCUMENTS

WO  WO-2017026931 A1 *  2/2017  ......... G06F 9/45533

OTHER PUBLICATIONS

'Speeding Up Packet I/O in Virtual Machines' by Rizzo et al., copyright 2013, IEEE. (Year: 2013).*

(Continued)

*Primary Examiner* — Steven G Snyder
(74) *Attorney, Agent, or Firm* — Lowenstein Sandler LLP (57) ABSTRACT

A hypervisor detects a virtual device configured by a virtual machine, generates a para-virtualized networking interface between the virtual device and a memory space within hypervisor memory, maps the memory space to a peripheral component interconnect (PCI) memory space of the virtual machine, and configures the memory space to be accessible to a physical device via direct memory access (DMA), where the physical device is associated with the virtual device of the virtual machine. The hypervisor then transfer packets between the virtual machine and the physical device using the para-virtualized networking interface.

19 Claims, 5 Drawing Sheets

(56) References Cited

U.S. PATENT DOCUMENTS

| | | | | |
|---|---|---|---|---|
| 9,904,564 | B2* | 2/2018 | Tsirkin | G06F 9/45558 |
| 9,948,579 | B1* | 4/2018 | Sivaramakrishnan | H04L 67/2842 |
| 10,037,222 | B2* | 7/2018 | Bolic | G06F 9/45558 |
| 10,164,911 | B2* | 12/2018 | Lakshnnanan | H04L 49/3045 |
| 2007/0061492 | A1* | 3/2007 | van Riel | G06F 9/5077 710/3 |
| 2011/0296411 | A1* | 12/2011 | Tang | G06F 9/45545 718/1 |
| 2013/0125115 | A1* | 5/2013 | Tsirkin | G06F 9/45558 718/1 |
| 2014/0281055 | A1* | 9/2014 | Davda | G06F 12/1081 710/26 |
| 2016/0147551 | A1* | 5/2016 | Tsirkin | G06F 9/45558 718/1 |
| 2016/0210167 | A1* | 7/2016 | Bolic | G06F 9/45558 |
| 2017/0046184 | A1* | 2/2017 | Tsirkin | G06F 9/45558 |
| 2017/0090968 | A1* | 3/2017 | Tsirkin | G06F 9/45558 |
| 2017/0097840 | A1* | 4/2017 | Bridgers | G06F 9/45558 |
| 2017/0149694 | A1* | 5/2017 | Lakshnnanan | H04L 49/3045 |
| 2017/0295024 | A1* | 10/2017 | Lin | H04L 29/06 |
| 2017/0322828 | A1* | 11/2017 | Panicker | G06F 9/45558 |
| 2019/0129873 | A1* | 5/2019 | Zhao | G06F 13/20 |

OTHER PUBLICATIONS

'High Performance Network Virtualization with SRIOV' by Dong et al., copyright 2009, IEEE. (Year: 2009).*

'Evaluating Standard-Based Self-Virtualizing Devices: A Performance Study on 10 GbE NICs with SR-IOV Support' by Jiuxing Liu, copyright 2010, IEEE. (Year: 2010).*

'PCI Configuration Base Address Registers (Writing Device Drivers)' by Oracle, 2010. (Year: 2010).*

"Memnic PMD" Data Plane Development Kit (DPDK) (Sep. 3, 2016) http://dpdk.org/doc/memnicpmd 2 pages.

* cited by examiner

SECURE ZERO-COPY PACKET FORWARDING

TECHNICAL FIELD

The present disclosure is generally related to computer systems, and more particularly, to secure device communication in virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." In some implementations, the guest OS and applications executing within the guest OS can be collectively referred to as the "guest."

Physical devices, such as network devices or video cards, can be made available to guests by the hypervisor by a process known as "device assignment." The guest can create a virtual device that is to be associated with a physical device so that any access of the virtual device can be forwarded to the physical device by the hypervisor with little or no modification

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for secure zero-copy packet forwarding between a guest and a physical device using shared memory. In virtualized systems, a hypervisor may expose a virtual device to a guest to permit the guest to execute instructions on the virtual device. For example, the guest may be associated with a networking interface card (NIC) via a virtual device of the guest, and the guest may execute an instruction to send a packet on the network attached to the NIC. Virtualized systems can use device assignment so that any access of the virtual device can be forwarded to the physical device by the hypervisor with little or no modification. Device assignment can provide significant performance benefits since virtual machines can communicate directly with physical devices with limited intervention by the hypervisor. However, device assignment exposes the entire memory space of the guest to the physical device to give the device control over where packets are written, which can have negative impacts on system security. Additionally, device assignment can disrupt hardware abstraction, typically causing a guest to install hardware dependent device drivers.

Some conventional implementations utilize para-virtualized networking interfaces such as VirtIO ring frameworks to virtualize communications between a virtual machine and the hypervisor. Such implementations preserve abstraction between a physical device and a virtual machine, but can often involve additional copy operations to transfer packets between the hypervisor and the physical device. Thus, in these cases while security may be improved, performance can often be degraded as a result.

Aspects of the present disclosure address the above noted and other deficiencies by implementing secure zero-copy packet forwarding to provide the benefits of device assignment without imposing the security limitations of exposing the entire guest memory to a physical device. In particular, the hypervisor can establish a para-virtualized networking interface (such as a VirtIO ring interface) between the host and a virtual device of a virtual machine. The para-virtualized networking interface can utilize a shared memory space within hypervisor memory for the transfer of packets to the physical device. The hypervisor may then configure the shared memory space so that the physical device may access this shared memory space directly (e.g., using direct memory access (DMA) operations) without involving any additional intervention by the hypervisor. Thus, aspects of the present disclosure may effectively extend a para-virtualized networking interface (e.g., a VirtIO ring) to include the physical device without granting the physical device access to the entire memory space of the virtual machine.

In an illustrative example, a hypervisor can detect a virtual device configured by a virtual machine. The hypervisor may generate a para-virtualized networking interface between the virtual device and a shared memory space within hypervisor memory. The hypervisor may configure the memory space to be accessible to the physical device via DMA, where the physical device is associated with the virtual device of the virtual machine. Subsequently, the hypervisor may transfer packets between the virtual machine and the physical device using the para-virtualized networking interface.

Accordingly, aspects of the present disclosure dramatically improve hypervisor security without significantly degrading performance by facilitating communication of a physical device directly with a virtual machine without device assignment. Utilizing a para-virtualized networking interface such as a VirtIO ring preserves hardware abstraction so that a guest may function on any host without installing hardware specific drivers. Additionally, aspects of the present disclosure can dramatically improve security over conventional device assignment since the physical hardware should not be able to access guest memory. Moreover, providing a physical device with DMA access to the VirtIO ring shared memory eliminates additional hypervisor copy operations, thereby providing significant performance improvements over conventional virtualized networking implementations. Thus, the performance needed to support wire-speed packet forwarding between guests and devices for network function virtualization implementation workloads can be achieved with increased security.

Figure 1:
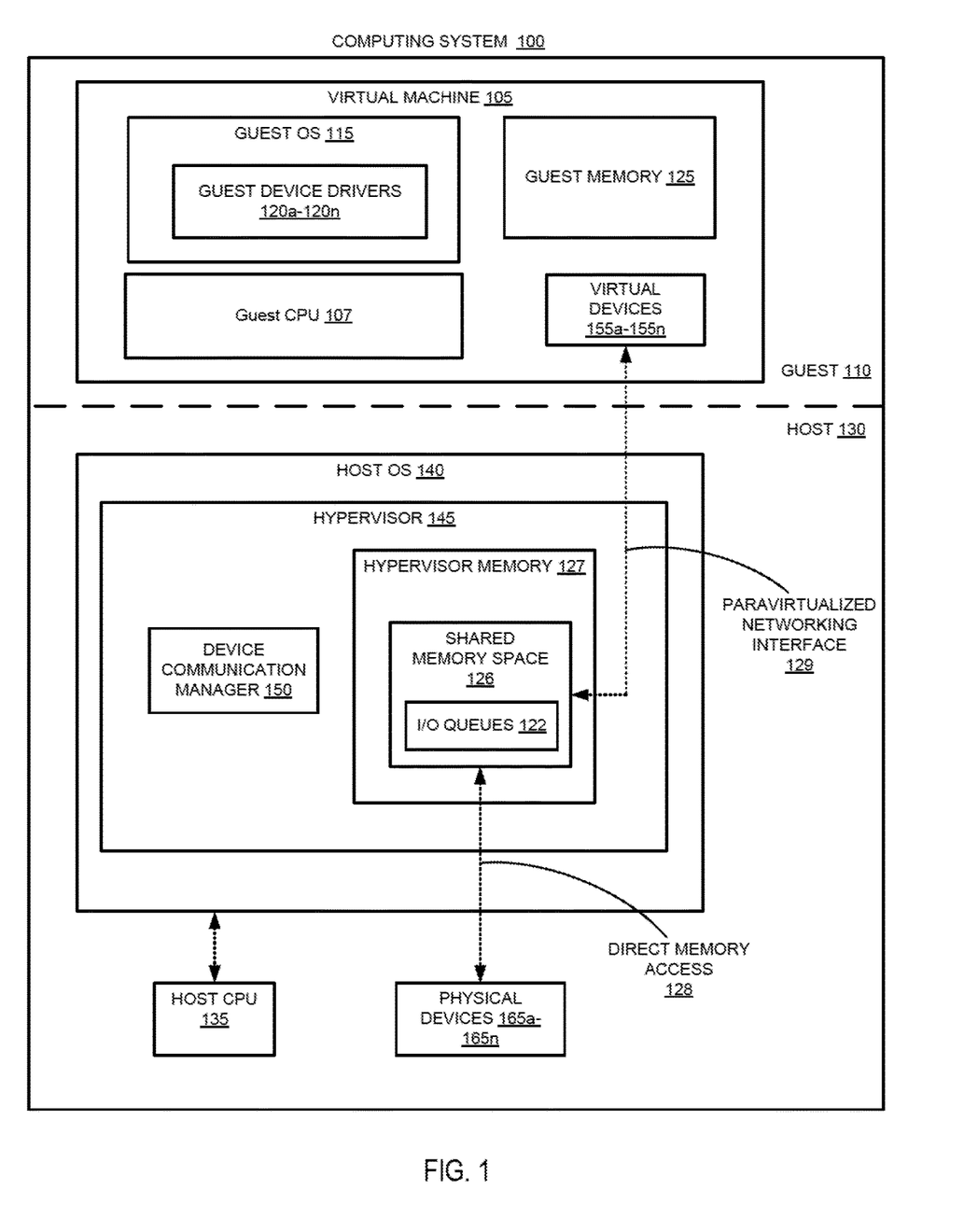
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. Other architectures for computer system 100 are possible, and implementations of a computer system utilizing examples of the present disclosure are not limited to the specific architecture depicted by FIG. 1.

As shown in FIG. 1, the computing system 100 hosts a virtual machine (VM) 105. The virtual machine 105 runs a guest (e.g., guest 110) that uses a guest operating system 115 to manage its resources. The virtual machine 105 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed applications, a browser, applications running on the browser, etc. The term "virtual machine" (VM) refers to part of a host system that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest 110, etc.

In one example, the computing system 100 runs a hypervisor 145 to virtualize or expose access to underlying host hardware (e.g., the physical devices 165a-165n) of a host 130, making the use of the virtual machine 105 transparent to the guest 110 and the users of the computing system 100. In one example, the hypervisor 145 may support the virtual machine 105. In one example, the hypervisor 145 is part of a host operating system (OS) 140 of the host 130.

In some implementations, the computing system 100 may also include hardware components (host hardware) including a host central processing unit (CPU) 135. The computing system 100 may also include host memory (not shown) and physical devices 165a-165n. In a virtualized environment, a virtual machine 105 may not have direct access to the physical devices 165a-165n.

Access to or emulation of a physical device (e.g., 165a) may be indirectly handled by the intervening hypervisor 145. The guest 110 may be configured to load device-specific modules (guest device drivers) 120a-120n associated with one or more virtual devices 155a-155n. In some implementations, virtual devices 155a-155n may correspond to one or more virtual Peripheral Component Interconnect (PCI) devices. The hypervisor 145 may be configured to emulate (e.g., provide the guest 115 with access to) the one or more virtual devices 155a-155n in cooperation with the guest device drivers 120a-120n residing on the virtual machine 105.

When the virtual device 155a-155n is loaded in the guest 110, corresponding guest device drivers 120a-120n are installed in the guest 110. For example, one device driver (e.g., 120a) may be configured to transmit packets to an external network (not shown, e.g., the Internet). Another device driver (e.g., 120b, 120n) may be responsible for writing data or reading data, respectively, outside of the virtual machine 105. When the guest 110 is loaded with a virtual device 155a-155n that includes corresponding memory pages, the guest 110 is informed about an identifier (ID) of the virtual device. The corresponding device driver (s) 120a-120n for the virtual device 155a-155n that are loaded in the guest 110 may create the writable mappings for the memory pages of the virtual device 155a-155n.

Once the virtual device 155a-155n is loaded in the guest 110, the guest 110 may inform the hypervisor 145, and specifically the device communication manager 150 of hypervisor 145, of one or more guest page addresses of the memory pages of the virtual device 155a-155n. In some implementations, the guest 110 may also provide data and length corresponding to the guest page addresses of the memory pages of the virtual device 155a-155n.

Device communication manager 150 may be responsible for configuring shared memory space 126 to facilitate secure guest-to-device communication without device assignment. In some implementations, device communication manager 150 may be a data plane development kit (DPDK) application executing on hypervisor 145. DPDK is a framework of libraries and network interface controller drivers for fast packet processing. Shared memory space 126 may be an area of hypervisor memory 127 to be shared between virtual devices 155a-155n and physical devices 165a-165n. In some implementations, shared memory space 126 may be a memory space of a DPDK application (e.g., device communication manger 150) executing on the hypervisor.

Device communication manager 150 may detect that the virtual device 155a-155n has been configured and loaded by the guest 110. Device communication manager 150 may discover the new virtual device 155a-155n by monitoring guest 110, receiving a notification from guest 110, or in any similar manner. Device communication manager 150 may subsequently generate para-virtualized networking interface 129 between virtual devices 155a-155n and shared memory space 126. In some implementations, para-virtualized networking interface 129 may be a VirtIO ring interface between hypervisor 145 and virtual devices 155a-155n. VirtIO is a standardized interface that can facilitate the implementation of simplified virtual devices 155a-155n in guest 110.

In implementations, device communication manager 150 may generate the para-virtualized networking interface 129 by initializing one or more I/O queues 128 for sending and receiving packets between hypervisor 145 and virtual devices 155a-155n. For example, packets received from guest 110 may be placed on a receive queue within I/O queues 122 by virtual devices 155a-155n via the para-virtualized networking interface 129. Similarly, packets to be sent to virtual devices 155a-155n may be placed on a send queue within I/O queues 122. In an illustrative example, where para-virtualized networking interface 129 is a VirtIO interface, the I/O queues 122 within shared memory space 126 may be a VirtIO ring buffer for the interface.

Device communication manger 150 may configure shared memory space 126 to be accessible by one of the physical devices 165a-165n (e.g., the physical device associated with the virtual device using para-virtualized networking interface 129) via direct memory access (DMA) 129. In implementations where para-virtualized networking interface 129 is a VirtIO interface, device communication manager 150 may configure the I/O queues 122 of the VirtIO ring in shared memory space 126 to be accessible via DMA by the corresponding physical device 165a-165n. Accordingly, device communication manager 150 can provide the physical device with the ability to access the VirtIO ring queues via direct memory access 128 without granting the physical device access to guest memory 125.

Subsequently, device communication manager 150 may transfer packets between virtual machine 105 and physical devices 165a-165n using the para-virtualized networking interface 129 and direct memory access 128. Device communication manager 150 is described in further detail below with respect to FIG. 2.

Figure 2:
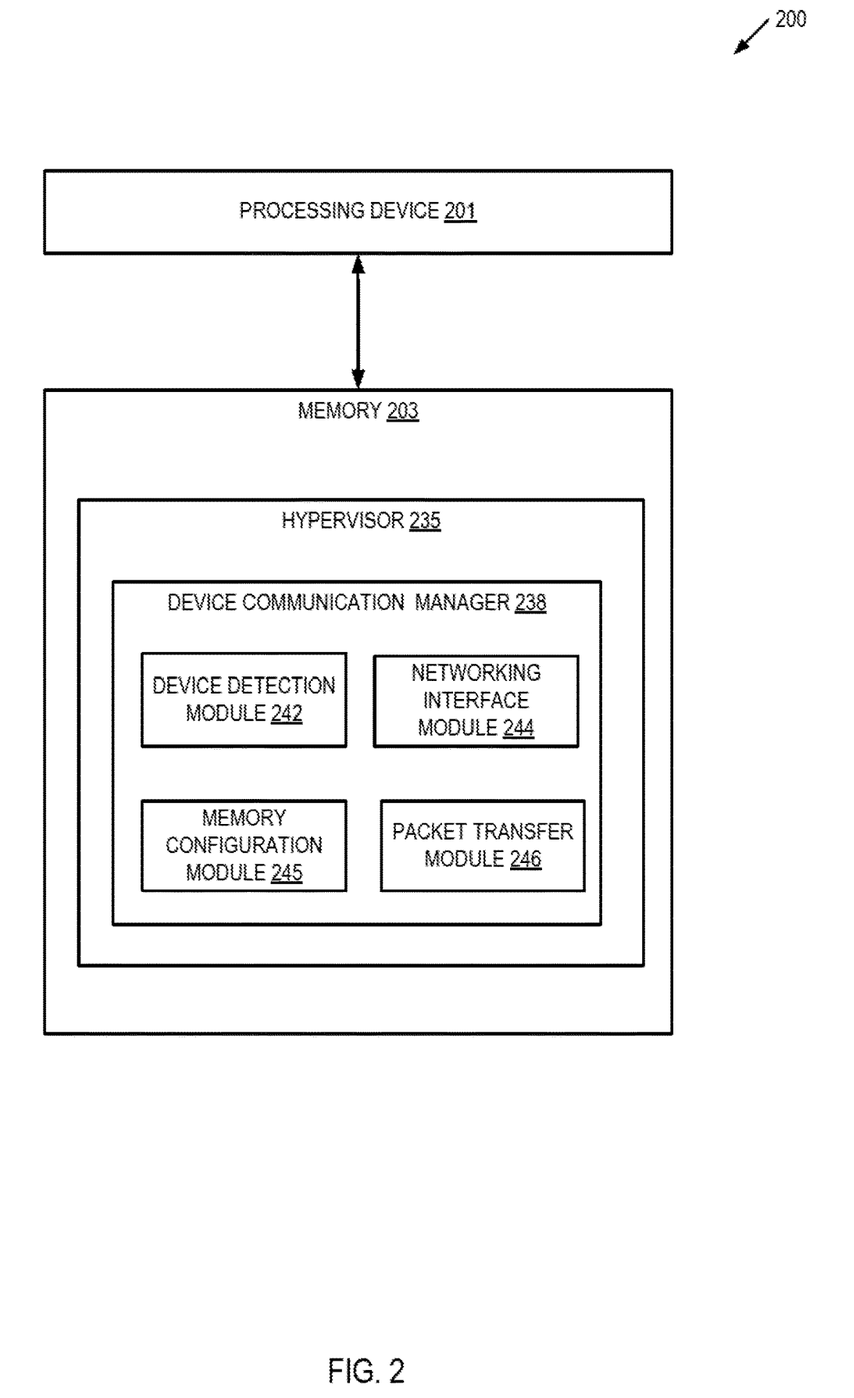
FIG. 2 depicts a block diagram illustrating an example of a device communication manager for facilitating secure zero-copy packet forwarding, in accordance with one or more aspects of the present disclosure.

FIG. 2 depicts a block diagram illustrating an example a device communication manager 238 for facilitating secure zero copy guest-to-device communication without device assignment. In some implementations, device communication manager 238 may correspond to device communication manager 150 of FIG. 1. As shown in FIG. 2, device communication manager 238 may be a component of a computing apparatus 200 that includes a processing device 201, operatively coupled to a memory 203, to execute a hypervisor 235. In some implementations hypervisor 235 may correspond to hypervisor 145 of FIG. 1. In some implementations, processing device 201 and memory 203 may correspond to processing device 502 and main memory 504 respectively as described below with respect to FIG. 5.

Device communication manager 238 may include device detection module 242, networking interface module 244, memory configuration module 245, and packet transfer module 246. Alternatively, the functionality of one or more of device detection module 242, networking interface module 244, memory configuration module 245, and packet transfer module 246 may be combined into a single module or divided into multiple sub-modules.

Device detection module 242 is responsible for detecting/discovering a virtual device created by a virtual machine associated with hypervisor 235. As noted above, the virtual machine may create the virtual device to communicate with a physical PCI device such as a network interface controller (NIC), an input output memory management unit (IOMMU), or the like. In some implementations, device detection module 242 may discover the virtual device by receiving a notification from the virtual machine that the virtual device has been created. Alternatively, device detection module 242 may discover the virtual device by monitoring the virtual machine to detect the creation of any virtual devices.

Once the virtual device has been detected, device communication manager 238 may invoke networking interface module 244 to generate and configure a para-virtualized networking interface between the virtual device and a shared memory space within hypervisor memory. Networking interface module 244 may allocate the shared memory space within hypervisor memory and expose the memory space to the virtual machine for use with the virtual device. In some implementations, networking interface module 244 may map the shared memory space to a peripheral component interconnect (PCI) memory space of the virtual machine, where the PCI memory space is associated with a PCI base address register (BAR) of the virtual device.

In some implementations, the para-virtualized networking interface may be a virtIO ring interface between the hypervisor 235 and the virtual device of the virtual machine. In these implementations, networking interface module 244 may configure the shared memory space by initializing one or more VirtIO ring queues that for sending and receiving packets between hypervisor 145 and the virtual device of the virtual machine.

Memory configuration module 245 may then be invoked to configure the shared memory space to be accessible to a physical device via direct memory access (DMA), where the physical device is associated with the virtual device of the virtual machine. As noted above the physical device may be a NIC, an IOMMU, or the like. Memory configuration module 245 may configure the shared memory space by mapping the shared memory space to the physical device for DMA operations. For example, memory configuration module 245 may expose the shared memory space to the physical device so that the physical device may access the shared memory space directly without involving the hypervisor to perform an intermediate copy operation.

In an illustrative example, memory configuration module 245 may configure the VirtIO ring queues in the shared memory space so that the physical device may read and write packets directly from and to the appropriate ring queues associated with the virtual device of the virtual machine. Thus, the physical device may be provided access to the VirtIO interface for the virtual device without being granted access to the entire memory space of the virtual machine.

Subsequently, packet transfer module 246 may be invoked to transfer packets between the virtual device of the virtual machine and the physical device using the para-virtualized networking interface (e.g., the VirtIO interface). In an illustrative example, packet transfer module 246 may receive a notification that the physical device has written a packet to the shared memory space using a DMA write operation. Packet transfer module 246 may receive this notification directly from the physical device once the physical device has written the packet, from a component of the hypervisor 235 that monitors the shared memory space, or in any other manner. Packet transfer module 246 may then send a notification to the virtual machine that the packet is available in the shared memory space. In some implementations, the notification can include an offset within the memory space that is associated with the location of the packet within the memory space. The virtual machine may then obtain the packet from the shared memory space using the para-virtualized networking interface (e.g., the VirtIO interface).

In another illustrative example, packet transfer module 246 may facilitate the virtual machine sending packets to the physical device. Packet transfer module 246 may detect that the virtual machine has written a packet to the shared memory space using the para-virtualized networking interface (e.g., the VirtIO interface). Packet transfer module 246 may detect the packet by receiving a notification from the virtual machine, by receiving a notification from a component of the hypervisor 235 that monitors the shared memory space, or in any other manner. For example, packet transfer module 246 may monitor the receive queue of the VirtIO ring within the shared memory space. Once a new packet has been detected, packet transfer module 246 may send a notification to the physical device that the packet has been written to the shared memory space. The physical device may then perform a DMA read operation to obtain the packet from the shared memory space (e.g., from the appropriate VirtIO ring queue).

Figure 3:
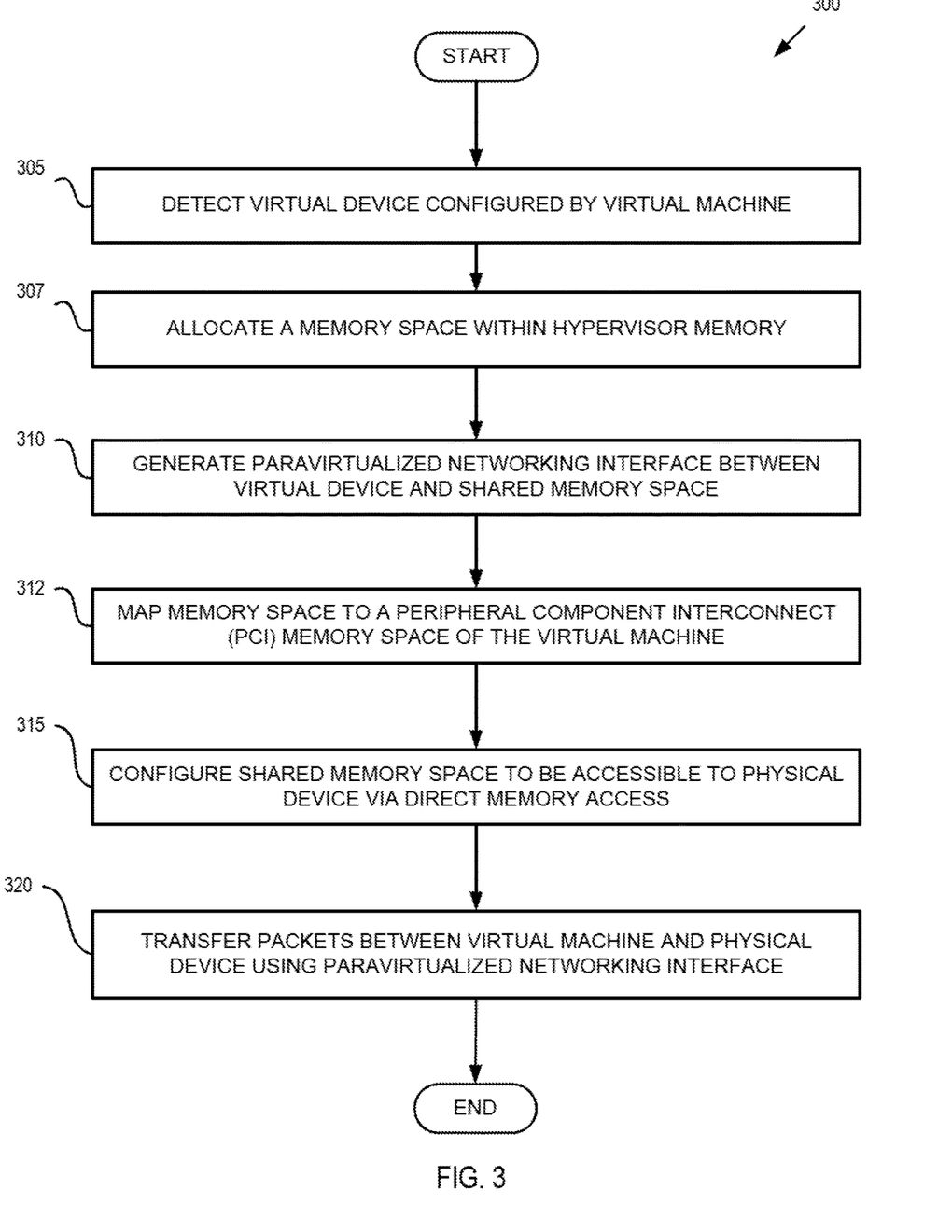
FIG. 3 depicts a flow diagram of a method for configuring secure zero-copy packet forwarding, in accordance with one or more aspects of the present disclosure.

FIG. 3 depicts a flow diagram of an example method 300 for configuring secure zero-copy packet forwarding. The method may be performed by processing logic that may comprise hardware (circuitry, dedicated logic, etc.), computer readable instructions (run on a general purpose computer system or a dedicated machine), or a combination of both. In one illustrative example, method 300 may be performed by device communication manager 150 of hypervisor 145 in FIG. 1. Alternatively, some or all of method 300 might be performed by another module or machine. It should be noted that blocks depicted in FIG. 3 could be performed simultaneously or in a different order than that depicted.

At block 305, processing logic detects a virtual device configured by a virtual machine. The virtual device may be configured by the virtual machine to communicate with a physical PCI device (e.g., a NIC, IOMMU, etc.) available to the hypervisor. In some implementations, processing logic may detect the virtual device by receiving a notification from the virtual machine. Alternatively, processing logic may discover the virtual device by monitoring the virtual machine.

At block 307, processing logic allocates a memory space within hypervisor memory. In some implementations, the memory space may be a shared memory space. At block 310, processing logic generates a para-virtualized networking interface between the virtual device and the memory space within hypervisor memory. At block 312, processing logic maps the memory space to the PCI memory space of the virtual machine. In some implementations, the PCI memory space is associated with a PCI base address register (BAR) of the virtual device.

At block 315, processing logic configures the shared memory space to be accessible to a physical device via direct memory access (DMA), where the physical device is associated with the virtual device of the virtual machine. In some implementations, processing logic configures the shared memory space by mapping the shared memory space to the physical device for DMA operations.

At block 320, processing logic transfers packets between the virtual machine and the physical device using the para-virtualized networking interface. In some implementations, processing logic receives a notification from the physical device that the physical device as written a packet to the shared memory space, and subsequently sends a notification to the virtual machine using the para-virtualized networking interface. In some implementations, processing logic detects that the virtual machine has written a packet to the shared memory space and sends a notification to the physical device that a packet has been written to the shared memory space. The physical device may then obtain the packet from the shared memory space using a DMA read operation. After block 320, the method of FIG. 3 terminates.

Figure 4:
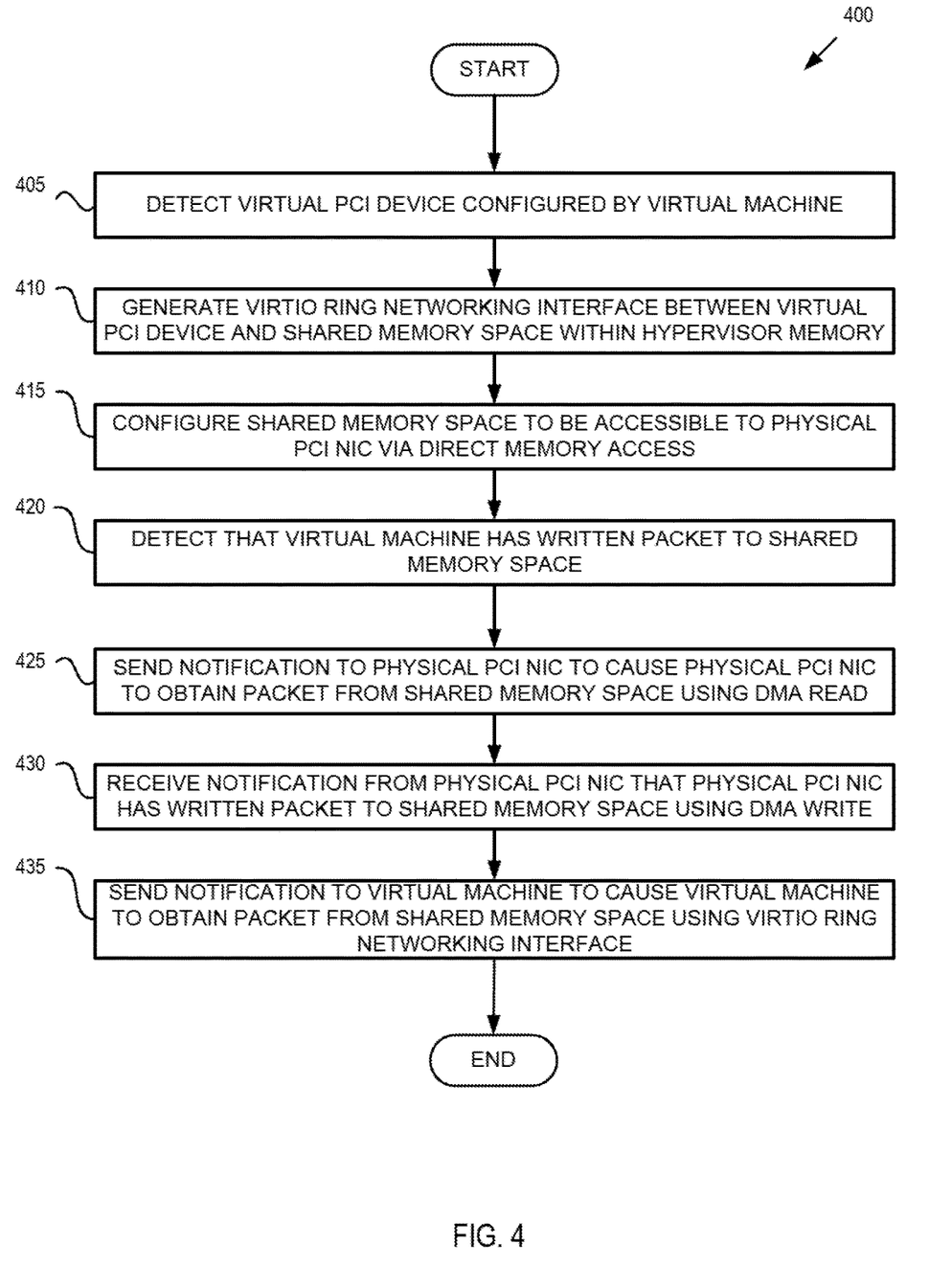
FIG. 4 depicts a flow diagram of a method for facilitating secure zero-copy packet forwarding, in accordance with one or more aspects of the present disclosure.

FIG. 4 depicts a flow diagram of an example method 400 for facilitating secure zero-copy packet forwarding using PCI memory. The method may be performed by processing logic that may comprise hardware (circuitry, dedicated logic, etc.), computer readable instructions (run on a general purpose computer system or a dedicated machine), or a combination of both. In one illustrative example, method 400 may be performed by device communication manager 150 of hypervisor 145 in FIG. 1. Alternatively, some or all of method 400 might be performed by another module or machine. It should be noted that blocks depicted in FIG. 4 could be performed simultaneously or in a different order than that depicted.

At block 405, processing logic detects a virtual PCI device configured by a virtual machine. The virtual device may be configured by the virtual machine to communicate with a physical PCI device (e.g., a network interface controller (NIC)) available to the hypervisor. In some implementations, processing logic may detect the virtual device by receiving a notification from the virtual machine. Alternatively, processing logic may discover the virtual device by monitoring the virtual machine.

At block 410, processing logic generates a VirtIO ring networking interface between the virtual PCI device and a shared memory space within hypervisor memory. In some implementations, processing logic allocates the shared memory space within hypervisor memory and maps the shared memory space to the PCI memory space of the virtual machine. In some implementations, the shared memory space includes a first VirtIO ring queue for transferring packets from the virtual machine to the physical PCI NIC and a second VirtIO ring queue for transferring packets from the physical PCI NIC to the virtual machine.

At block 415, processing logic configures the shared memory space to be accessible to a physical PCI NIC via direct memory access (DMA), where the physical PCI NIC is associated with the virtual device of the virtual machine. In some implementations, processing logic configures the shared memory space by mapping the first VirtIO ring queue in the shared memory space to the physical PCI NIC for DMA read operations, and mapping the second VirtIO ring queue in the shared memory space to the physical PCI NIC for DMA write operations.

At block 420, processing logic detects that the virtual machine has written a packet to the shared memory space. In some implementations, processing logic detects that the virtual machine has written a packet to the first VirtIO ring queue. At block 425, processing logic sends a notification to the physical PCI NIC to cause the physical PCI NIC to obtain the packet from the shared memory space using a DMA read operation.

At block 430, processing logic receives a notification from the physical PCI NIC that the physical PCI NIC has written a packet to the memory pace using a DMA write operation. In some implementations, processing logic receives a notification that the physical PCI NIC has written the packet to the second VirtIO ring queue. At block 435, processing logic sends a notification to the virtual machine to cause the virtual machine to obtain the packet from the shared memory space via the VirtIO ring networking interface. After block 435, the method of FIG. 4 terminates.

Figure 5:
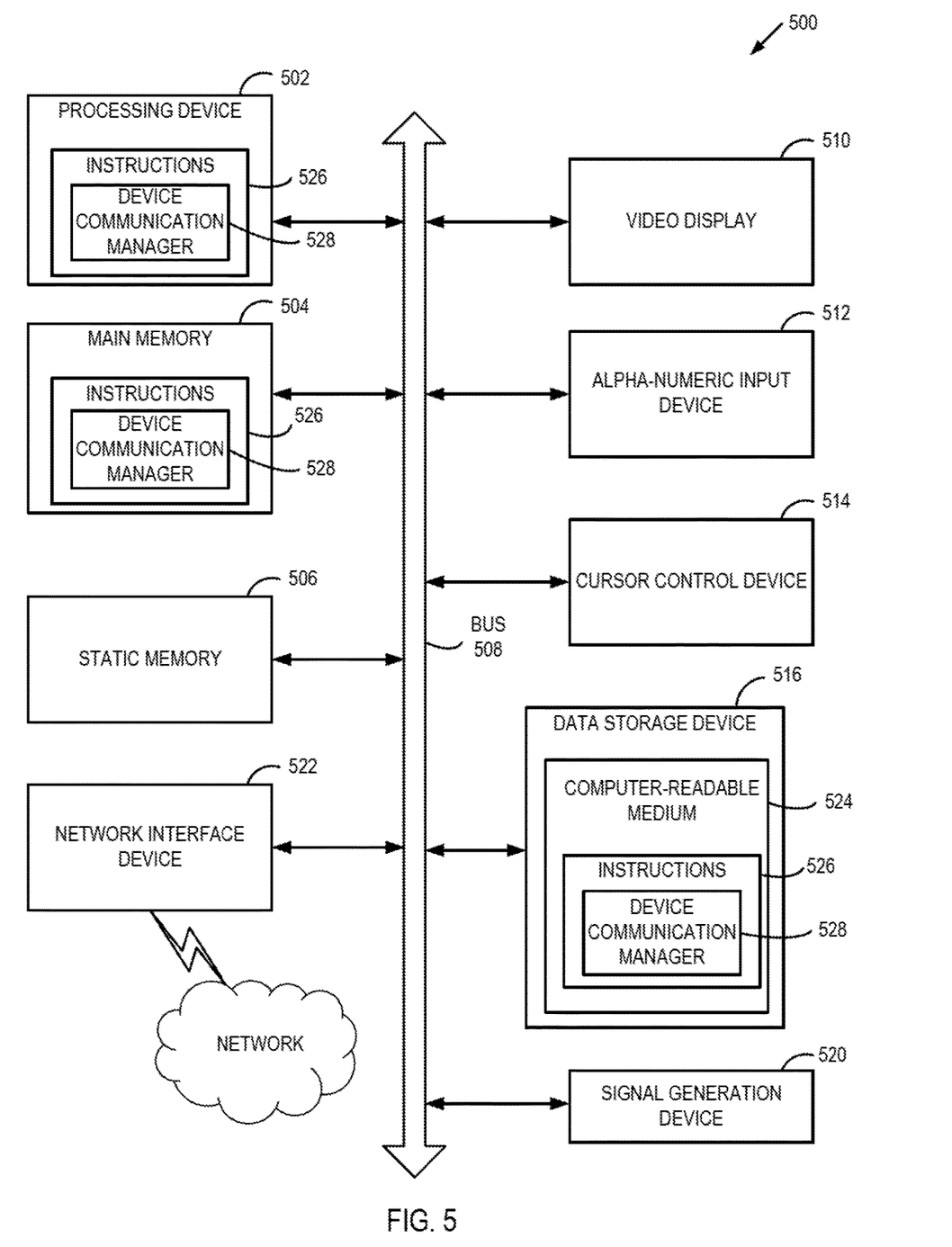
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes device communication manager 528 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include device communication manager 528 (e.g., corresponding to the methods of FIGS. 3-4, etc.) embodying any one or more of the methodologies or functions described herein. Device communication manager 528 may also reside, completely or at least partially, within the main memory 504 and/or within the processing device 502 during execution thereof by the computer system 500, the main memory 504 and the processing device 502 also constituting computer-readable media. Device communication manager 528 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "configuring," "detecting," "transferring," "allocating," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method, comprising:
    detecting, by a processing device executing a hypervisor, a virtual device configured by a virtual machine, wherein the virtual device is associated with a physical device;
    allocating a first portion of a hypervisor memory of the hypervisor as a shared memory space accessible by the virtual machine and the physical device;
    configuring, by the processing device executing the hypervisor, a para-virtualized networking interface between the virtual device and the shared memory space by mapping the shared memory space of the hypervisor to a second portion of a memory space of the virtual machine, wherein the second portion of the memory space of the virtual machine corresponds to a virtual device memory space for the virtual device of the virtual machine, the virtual device memory space corresponding to a peripheral component interconnect (PCI) memory space of the virtual machine associated with a PCI base address register (BAR) of the virtual device;
    configuring the shared memory space of the hypervisor to be directly accessible to the physical device via direct memory access (DMA); and
    causing, by the processing device executing the hypervisor, packets to be obtained from the shared memory space of the hypervisor by the virtual machine via the mapping and also causing the packets to be obtained from the shared memory space of the hypervisor by the physical device via the DMA.

2. The method of claim 1, wherein the para-virtualized networking interface comprises a VirtIO ring interface.

3. The method of claim 2, wherein the physical device comprises at least one of a network interface controller (NIC) or an input output memory management unit (IOMMU).

4. The method of claim 2, wherein the shared memory space comprises memory of a data plane development kit (DPDK) application executing on the hypervisor.

5. The method of claim 2, wherein configuring the memory space of the hypervisor to be directly accessible to a physical device comprises:
    mapping the shared memory space to the physical device for DMA operations.

6. The method of claim 1, wherein causing the packets to be obtained comprises:
    receiving a notification from the physical device that the physical device has written a packet to the shared memory space using a DMA operation; and
    sending a notification to the virtual machine that the packet is available in the shared memory space, wherein the notification comprises an offset within the shared memory space that is associated with the location of the packet within the shared memory space.

7. The method of claim 1, wherein causing the packets to be obtained comprises:
    detecting that the virtual machine has written a packet to the shared memory space using the para-virtualized networking interface;
    sending a notification to the physical device that packet has been written to the shared memory space.

8. A computing apparatus comprising:
    a memory; and
    a processing device, operatively coupled to the memory, to execute a hypervisor to:
        detect, by the processing device executing the hypervisor, a virtual device configured by a virtual machine, wherein the virtual device is associated with a physical device;
        allocate a first portion of a hypervisor memory of the hypervisor as a shared memory space accessible by the virtual machine and the physical device;
        configure, by the processing device executing the hypervisor, a para-virtualized networking interface between the virtual device and the shared memory space by mapping the shared memory space of the hypervisor to a second portion of a memory space of the virtual machine, wherein the second portion of the memory space of the virtual machine corresponds to a virtual device memory space for the virtual device of the virtual machine, the virtual device memory space corresponding to a peripheral component interconnect (PCI) memory space of the virtual machine associated with a PCI base address register (BAR) of the virtual device;
        configure the shared memory space of the hypervisor to be directly accessible to the physical device via direct memory access (DMA); and
        cause, by the processing device executing the hypervisor, packets to be obtained from the shared memory space of the hypervisor by the virtual machine via the mapping and also cause the packets to be obtained from the shared memory space of the hypervisor by the physical device via the DMA.

9. The computing apparatus of claim 8, wherein the para-virtualized networking interface comprises a VirtIO ring interface.

10. The computing apparatus of claim 9, wherein the physical device comprises at least one of a network interface controller (NIC) or an input output memory management unit (IOMMU).

11. The computing apparatus of claim 9, wherein the shared memory space comprises memory of a data plane development kit (DPDK) application executing on the hypervisor.

12. The computing apparatus of claim 9, wherein to configure the shared memory space of the hypervisor to be directly accessible to the physical device, the processing device is to:
    map the shared memory space to the physical device for DMA operations.

13. The computing apparatus of claim 8, wherein to cause the packets to be obtained, the processing device is to:
    receive a notification from the physical device that the physical device has written a packet to the shared memory space using a DMA operation; and
    send a notification to the virtual machine that the packet is available in the shared memory space, wherein the notification comprises an offset within the shared memory space that is associated with the location of the packet within the shared memory space.

14. The computing apparatus of claim 8, wherein to cause the packets to be obtained, the processing device is to:
 detect that the virtual machine has written a packet to the shared memory space using the para-virtualized networking interface;
 send a notification to the physical device that packet has been written to the shared memory space.

15. A non-transitory computer readable storage medium, having instructions stored therein, which when executed by a processing device of a computer system, cause the processing device to:
 detect, by the processing device executing a hypervisor, a virtual peripheral component interconnect (PCI) device configured by a virtual machine, wherein the virtual PCI device is associated with a physical PCI network interface controller (NIC) device;
 allocate a first portion of a memory space within hypervisor memory of the hypervisor as a shared memory space accessible by the virtual machine and the physical device;
 generate a VirtIO ring networking interface between the virtual PCI device and the shared memory space within the hypervisor memory by mapping the shared memory space of the hypervisor to a second portion of a memory space of the virtual machine, wherein the second portion of the memory space of the virtual machine corresponds to a virtual device memory space for the virtual PCI device of the virtual machine, the virtual device memory space corresponding to a PCI memory space of the virtual machine associated with a PCI base address register (BAR) of the virtual device;
 configure the shared memory space of the hypervisor to be directly accessible to the physical PCI NIC device via direct memory access (DMA); and
 cause, by the processing device executing the hypervisor, packets to be obtained from the shared memory space of the hypervisor by the virtual PCI device via the mapping and also cause the packets to be obtained from the shared memory space of the hypervisor by the physical PCI NIC device via the DMA;
 wherein the processing device to cause the packets to be obtained comprises the processing device to, responsive to detecting that the virtual machine has written a packet to the shared memory space, sending a notification to the physical PCI NIC device to cause the physical PCI NIC device to obtain the packet from the shared memory space using a DMA read operation.

16. The non-transitory computer readable storage medium of claim 15, wherein the processing device to cause the packets to be obtained comprises the processing device to:
 responsive to receiving a notification from the physical PCI NIC device that the physical PCI NIC device has written a packet to the shared memory pace using a DMA write operation, sending a notification to the virtual machine to cause the virtual machine to obtain the packet from the shared memory space via the VirtIO ring networking interface.

17. The non-transitory computer readable storage medium of claim 15, wherein the notification comprises an offset within the shared memory space that is associated with the location of the packet within the shared memory space.

18. The non-transitory computer readable storage medium of claim 15, wherein the shared memory space comprises a first VirtIO ring queue for transferring packets from the virtual machine to the physical PCI NIC device and a second VirtIO ring queue for transferring packets from the physical PCI NIC device to the virtual machine.

19. The non-transitory computer readable storage medium of claim 15, wherein the shared memory space comprises input/output (I/O) queues to store the packets.

* * * * *